United States Patent
Feng et al.

(10) Patent No.: US 8,331,379 B2
(45) Date of Patent: Dec. 11, 2012

(54) METHOD AND DEVICE FOR SENDING UPSTREAM TRANSFER FRAME IN PASSIVE OPTICAL NETWORK

(75) Inventors: Dongning Feng, Shenzhen (CN); Dongyu Geng, Shenzhen (CN); Jing Li, Shenzhen (CN); Wai Kong Raymond Leung, Shenzhen (CN); Frank Effenberger, Colts Neck, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/270,035

(22) Filed: Oct. 10, 2011

(65) Prior Publication Data

US 2012/0027407 A1 Feb. 2, 2012

Related U.S. Application Data

(63) Continuation of application No. 13/219,075, filed on Aug. 26, 2011, which is a continuation of application No. PCT/CN2009/074496, filed on Oct. 19, 2009.

(30) Foreign Application Priority Data

Feb. 27, 2009 (CN) .......................... 2009 8 0074496

(51) Int. Cl.
*H04L 12/28* (2006.01)
(52) U.S. Cl. ...................................... 370/395.51; 398/66
(58) Field of Classification Search .................. None
See application file for complete search history.

(56) References Cited

U.S. PATENT DOCUMENTS

| | | | |
|---|---|---|---|
| 7,307,551 B2 | 12/2007 | Inoue et al. | |
| 2002/0003812 A1* | 1/2002 | Haartsen | 370/474 |
| 2002/0120758 A1* | 8/2002 | Chang | 709/230 |
| 2002/0171895 A1 | 11/2002 | Chang | |
| 2005/0254491 A1 | 11/2005 | Lenell et al. | |
| 2008/0002973 A1 | 1/2008 | Yamabana et al. | |

(Continued)

FOREIGN PATENT DOCUMENTS

CN 101364844 A 2/2009

(Continued)

OTHER PUBLICATIONS

International Search Report issued in corresponding PCT Application No. PCT/CN2009/070585, mailed Dec. 3, 2009.

(Continued)

*Primary Examiner* — Phirin Sam
(74) *Attorney, Agent, or Firm* — Brinks Hofer Gilson & Lione

(57) ABSTRACT

The present disclosure relates to the Passive Optical Network (PON) technology, and a method for sending an upstream transfer frame in a PON is provided, so as to improve flexibility of a system and satisfy a requirement that an error probability is reduced as low as possible. The method includes: after success of link, sending a preamble according to an allocated time slot, sending a burst synchronization delimiter, and then sending successively a burst header, a Gigabit-Capable Passive Optical Network (GPON) Transmission Convergence (GTC) frame header, and GTC frame data. In the sent synchronization delimiter, the number of non-zeros is the same as the number of zeros, and in a delimiter sequence, the number of non-zeros on odd bits is equal to the number of zeros on even bits, and the number of non-zeros on even bits is equal to the number of zeros on odd bits.

15 Claims, 2 Drawing Sheets

U.S. PATENT DOCUMENTS

| | | | |
|---|---|---|---|
| 2008/0069562 A1* | 3/2008 | Ivry | 398/52 |
| 2009/0123159 A1* | 5/2009 | Leung et al. | 398/154 |
| 2009/0180491 A1* | 7/2009 | Sala et al. | 370/442 |
| 2009/0226170 A1* | 9/2009 | Zou | 398/79 |
| 2010/0111532 A1 | 5/2010 | Chen et al. | |
| 2010/0208752 A1* | 8/2010 | Julien et al. | 370/476 |
| 2010/0322626 A1* | 12/2010 | Kim et al. | 398/63 |
| 2011/0200326 A1* | 8/2011 | Kazawa et al. | 398/25 |
| 2011/0200328 A1* | 8/2011 | In De Betou et al. | 398/38 |
| 2011/0211827 A1* | 9/2011 | Soto et al. | 398/25 |

FOREIGN PATENT DOCUMENTS

| | | |
|---|---|---|
| JP | 200466524 A | 9/2004 |
| WO | WO 2009/152668 A1 | 12/2009 |

OTHER PUBLICATIONS

Written Opinion of the International Search Authority issued in corresponding PCT Application No. PCT/CN2009/070585, mailed Dec. 3, 2009.

Written Opinion of the International Search Authority issued in corresponding PCT Application No. PCT/CN2009/074496, mailed Jan. 28, 2010.

The International Search Report issued in corresponding PCT Application No. PCT/CN2009/070585, mailed Dec. 3, 2009.

Office Action issued in commonly owned U.S. Appl. No. 13/219,075, mailed Dec. 1, 2011.

Extended European Search Report issued in corresponding European Patent Application No. 09840652.3, mailed Jun. 12, 2012.

Effenberger et al., "FEC Synchronization and Framing" P802.3av, Monterey, California, Jan. 15, 2007. XP-002604382.

Takigawa et al., "ATM Based Passive Double Star System Offering B-ISDN, N-ISDN, and POTS" IEEE 1993.

International Telecommunication Union, "Gigabit-Capable Passive Optical Networks (GPON): Physical Media Dependent (PMD) Layer Specification" Series G: Transmission Systems and Media, Digital Systems and Networks. ITU-T G.984.2, Mar. 2003.

* cited by examiner

METHOD AND DEVICE FOR SENDING UPSTREAM TRANSFER FRAME IN PASSIVE OPTICAL NETWORK

CROSS-REFERENCE TO RELATED APPLICATIONS

This application is a continuation of U.S. patent application Ser. No. 13/219,075, filed on Aug. 26, 2011, which is a continuation of International Application No. PCT/CN2009/074496, filed on Oct. 19, 2010. The International Application claims priority to International Application No. PCT/CN2009/070585, filed on Feb. 27, 2009. The afore-mentioned patent applications are hereby incorporated by reference in their entireties

FIELD OF THE DISCLOSURE

The present disclosure relates to a Passive Optical Network (PON) technology, and in particular, to a method and device for sending an upstream transfer frame in a PON.

BACKGROUND

Due to advantages of easy maintenance, high bandwidth, and low cost, the PON, as an ideal physical platform in which various services, such as voice, data, and video, are accessed in an integrated manner through a single platform, becomes the best in optical access technologies. The PON technology is a Point to Multipoint (P2MP) optical fiber access technology. The PON is formed by an Optical Line Terminal (OLT), Optical Network Units (ONUs), and an Optical Distribution Network (ODN), and the advantages come from a passive optical splitter/coupler in the ODN, so that the PON does not need to use elements that have amplifying and relaying functions. The PON adopts a P2MP topology structure, so that the PON needs to adopt a P2MP multiple access protocol to enable the ONUs to share the OLT and the backbone optical fiber. It is agreed in the PON system that a direction of data from the OLT to the ONU is a downstream direction, and a direction from the ONU to the OLT is an upstream direction. Currently, in terms of the borne content, the PON may be divided into many types, where Gigabit-Capable Passive Optical Network (GPON) is relatively important. The GPON system adopts a Wavelength Division Multiplexing (WDM) technology, and realizes bi-directional transmission in a single fiber. In order to separate signals in come and go directions of a plurality of users on the same optical fiber, a downstream data stream adopts a broadcast technology; and an upstream data stream adopts a Time Division Multiple Access (TDMA) technology.

Transmission of the GPON in the upstream direction is in a burst mode. Each ONU sends data to the OLT according to a particular time slot allocated by the OLT. When receiving the data of each ONU, the OLT needs to first perform synchronization to acquire a start position of a data frame sent by the ONU, and then start to receive the data. In ITU-T G.984.3 standard, an upstream burst receiving synchronization mechanism is given. A preamble field and a delimiter field are set in the front of an upstream burst frame of the GPON. The OLT performs receiving synchronization of the upstream burst frame by using the two fields.

The preamble field is a string of binary sequence, which is convenient for a receiving end of the OLT to perform automatic gain control, clock recovery, and synchronous receiving. When receiving the upstream burst frame, the OLT enables the delimiter to match the received upstream burst frame. After success of matching, the OLT may learn the start position of the data in the burst frame, so as to finish the synchronization operation. In the solution of the prior art, six types of delimiter fields are defined, and the user may select one to perform configuration as required.

The error probability defined in the current GPON system is $10^{-4}$, and $P(lost\_burst) \leq 10^{-10}$. The delimiter given in the G984.3 standard can only satisfy the requirement of the existing GPON system. However, in the GPON system of the next generation, both upstream and downstream transmission rates need to be improved and are required to support full service, so that new requirements are brought to the bit error rate of the channels and the receiving end. It is quite difficult for the delimiter field that has the length of 16 bits or 20 bit and is given in the prior art to satisfy the requirement of the GPON system of the next generation, so that it is necessary to provide a new burst synchronization delimiter field and a method for sending an upstream transfer frame.

SUMMARY

An embodiment of the present disclosure provides a method for sending an upstream transfer frame in a PON, so as to improve flexibility of a system and reduce an error probability.

The method includes:

after success of link, sending a preamble according to an allocated time slot;

sending a burst synchronization delimiter, where in the sent synchronization delimiter, the number of non-zeros is the same as the number of zeros, and in a delimiter sequence, the number of non-zeros on odd bits is equal to the number of zeros on even bits, and the number of non-zeros on even bits is equal to the number of zeros on odd bits, the number of zeros on the odd bits is N, the number of non-zeros on the odd bits is M, a relation $|N-M| \leq 1$ is satisfied, in the burst synchronization delimiter, the number of zeros in a continuous zero group is X, the number of non-zeros in a continuous non-zero group is Y, a relation $|X-Y| \leq 1$ is satisfied; and sending in sequence a burst header, a GPON Transmission Convergence (GTC) frame header, and GTC frame data.

An embodiment of the present disclosure further provides a device for sending an upstream transfer frame in a PON, which includes: an preamble sending unit, configured to send a preamble according to an allocated time slot;

a synchronization delimiter sending unit, configured to send a burst synchronization delimiter, where in the sent synchronization delimiter, the number of non-zeros is the same as the number of zeros, and in a delimiter sequence, the number of non-zeros on odd bits is equal to the number of zeros on even bits, and the number of non-zeros on even bits is equal to the number of zeros on odd bits, the number of zeros on the odd bits is N, the number of non-zeros on the odd bits is M, a relation $|N-M| \leq 1$ is satisfied, that is, a difference between N and M is not greater than 1; in the synchronization delimiter, the number of zeros in a continuous zero group is X, the number of non-zeros in a continuous non-zero group is Y, and a relation $|X-Y| \leq 1$ is satisfied; and a burst header sending unit, configured to send a burst header;

a GTC frame header sending unit, configured to send a GTC frame header; and a GTC frame data sending unit, configured to send GTC frame data.

In the embodiments of the present disclosure, a method that is capable of sending an upstream transfer frame of a GPON system of the next generation is provided, where a better delimiter sequence is adopted, and a sequence provided in the embodiments of the present disclosure may effectively improve the flexibility of the system and reduce the error probability.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings described in the following are only some embodiments of the present disclosure, and persons of ordinary skill in the art can derive other drawings from the accompanying drawings without creative efforts.

DETAILED DESCRIPTION OF THE EMBODIMENTS

The technical solutions of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

In upstream transmission of a PON system, data is transferred in a time division multiplex access manner. An upstream link is divided into different time slots, and an upstream time slot is allocated to each ONU according to an upstream bandwidth map information field of a downstream frame, so that all of the ONUs may send the data according a certain order, thereby eliminating conflicts due to the contest on the time slots.

Figure 1:
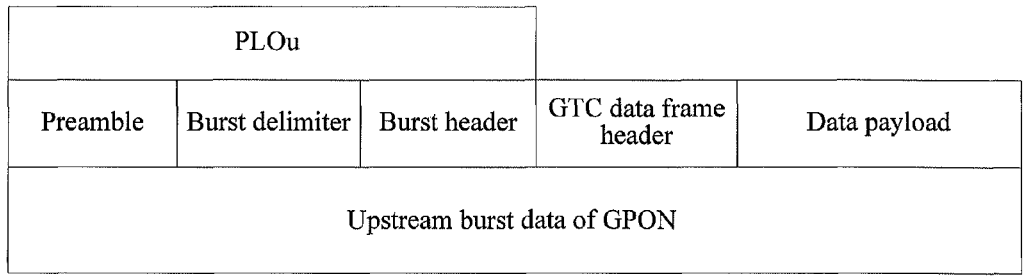
FIG. 1 is a schematic structure diagram of an upstream burst frame of a GPON according to an embodiment of the present disclosure.

In the embodiment of the present disclosure, the illustration is given in combination with a GPON system, a structure of an upstream burst frame of the GPON is as shown in FIG. 1. The upstream burst frame of the GPON is formed by a Physical Layer Overhead upstream (PLOu) a GTC overhead (data frame header) field, and a GTC payload (data payload) field. Guard Time is protection time between burst frames, and is added to a frame header of the burst frame.

The PLOu is a physical control header of a burst frame of the GPON, and is mainly used for frame positioning, synchronization, and identifying the ONU that sends the frame. The PLOu is formed by a Preamble (preamble), a Delimiter (burst synchronization delimiter), and a Burst Header (burst header). The GTC Overhead is a data frame header of a GTC framing sub-layer data packet, and includes a Physical Layer Operation Administration Maintenance upstream (PLOAMu) and a Dynamic Bandwidth Report upstream (DBRu). The PLOAMu mainly reports a Physical Layer Operation Administration Maintenance (PLOAM) message of the upstream data, which is mainly an administration message of maintenance and administration states of the ONU. The DBRu is mainly used to apply for a bandwidth for the next transmission, so as to finish Dynamic Bandwidth Assignment (DBA) of the ONU. During application, possibly not every frame includes the PLOAMu and the DBRu, and the OLT and the ONU need to negotiate about the issue that which frame can include the PLOAMu and the DBRu. The GTC payload is data payload, and may be a DBA state report or a data frame. If the GTC payload is the data frame, the GTC payload may be divided into a GPON Encapsulation Method (GEM) header and a GEM Frame.

Figure 2:
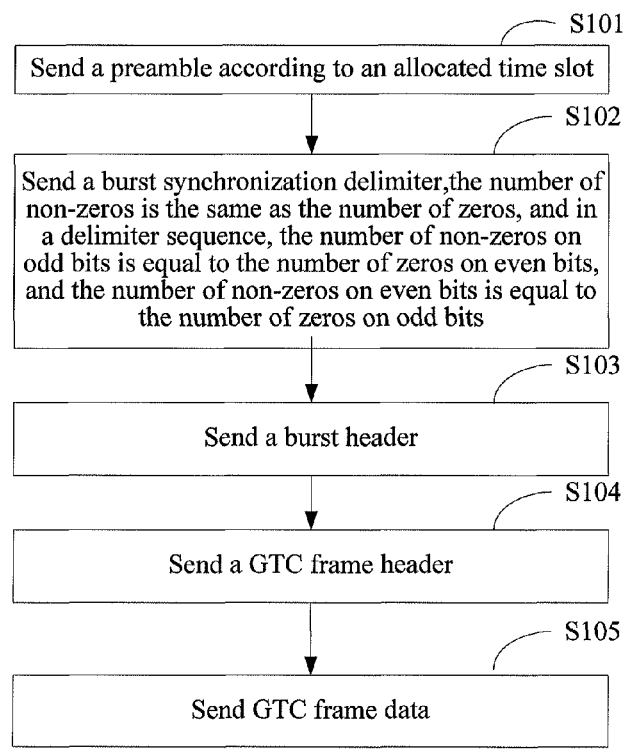
FIG. 2 is a flow chart of a method for sending an upstream transfer frame in a PON according to an embodiment of the present disclosure.

FIG. 2 is a flow chart of a method for sending an upstream transfer frame applied in a PON.

S101: Send a preamble according to an allocated time slot; during specific implementation, the preamble is preferentially selected as a sequence binarily represented as 1010 1010 . . . (hexadecimally represented as 0x AA . . . ).

S102: Send a burst synchronization delimiter, where in the sent synchronization delimiter, the number of non-zeros is the same as the number of zeros, and in a delimiter sequence, the number of non-zeros on odd bits is equal to the number of zeros on even bits, and the number of non-zeros on even bits is equal to the number of zeros on odd bits; the number of zeros on the odd bits is N, the number of non-zeros on the odd bits is M, a relation $|N-M|\leq 1$ is satisfied, that is, a difference between N and M is not greater than 1 (or the number of zeros on the even bits is N, and the number of non-zeros is M, the relation $|N-M|\leq 1$ is satisfied); in the synchronization delimiter, the number of zeros in a continuous zero group is X, the number of non-zeros in a continuous non-zero group is Y, and a relation $|X-|\leq 1$ is satisfied.

S103: Send a burst header, configured to detect a link bit error rate, an identifier ONU-ID, and a real-time state report of the ONU.

S104: Send a GTC frame header.

S105: Send GTC frame data.

During specific implementation, system differentiation may be added, when it is necessary to select the transmission rate, the upstream transmission rate is determined, and delimiter instructions A and B corresponding to two rates are defined in the PLOAM downstream (PLOAMd), where A is 2.5 gigabits per second (Gbps) and B is 10 Gbps. The rates should be determined before step S102. Before the burst synchronization delimiter is sent, the upstream transmission rate is determined.

The preamble, the delimiter, and the pre-time delay of the physical control header of the ONU upstream burst frame of the GPON system are set according to parameters in Upstream_Overhead sent by the OLT. The delimiter of the ONU upstream burst frame is used to enable a receiving end of the OLT to correctly synchronize with the upstream burst frame sent by the ONU. The incorrect burst frame synchronization may result in the prolonging of the time delay of the system, or even result in the breakdown of the receiving end of the OLT, so that the selected delimiter needs to reduce the probability of the incorrect synchronization as much as possible. Forward Error Control (FEC) encoding is not performed on the delimiter, that is, the delimiter is not protected by the FEC. Therefore, the self-relativity of the delimiter is required to be large, and a relativity value of the delimiter with a shift sequence is required to be as small as possible, that is, the shift sequence's minimum hamming distance between the delimiter and the sequence formed by the preamble and the delimiter is required to be as large as possible.

The delimiter is not protected by the FEC encoding, during a channel transmission procedure, due to interference of noise, the bit error rate is relatively high. Therefore, it is required that under a condition that synchronization performances are not affected, the receiving end of the OLT shall set an acceptable bit error rate to improve the synchronization probability of the burst frame synchronization or reduce the time delay resulting from the synchronization. The acceptable bit error rate is a bit error threshold, for example, $$\left\lfloor \frac{L}{4} - 1 \right\rfloor,$$

where L is the length of the burst synchronization delimiter.

The embodiment of the present disclosure provides a group of delimiter sequences applicable to the GPON system of the next generation, where if the delimiter sequence is Direct Current (DC) Balance, that is, the number of non-zeros is the same as the number of zeros, and in the delimiter sequence, the number of non-zeros on the odd bits is equal to the number of zeros on the even bits, and the number of non-zeros on the even bits is equal to the number of zeros on the odd bits; the number of zeros on the odd bits is N, the number of non-zeros on the odd bits is M, the relation $|N-M| \leq 1$ is satisfied, that is, the difference between N and M is not greater than 1; the number of zeros in a continuous zero group is X, the number of non-zeros in a continuous non-zero group is Y, and the relation $|X-Y| \leq 1$ is satisfied.

The delimiter sequences matching the preamble being 1010 1010 . . . (formed by a cycle of 10) are as shown in Table 1, that is, the minimum hamming distance between the delimiter and the shift sequence of the delimiter is $$\left\lfloor \frac{L-1}{2} \right\rfloor$$

(where L is the length of the burst synchronization delimiter), so that under the condition that the corresponding complexity is not increased in the system, the incorrect synchronization lock probability of the burst synchronization between the receiving end of the OLT and the upstream burst frame sent by the ONU is effectively reduced.

TABLE 1

Delimiter sequences provided in the embodiment of the present disclosure

| Bit length | Delimiter sequence (binary) | Delimiter sequence (hexadecimal) |
| --- | --- | --- |
| 24 | 111110000101001010011001 | F85299 |
|  | 100000111010110010011001 | 83D699 |
| 28 | 1011011101101001000011110000 | B7690F0 |
|  | 0011101111010100001011001001 | 3BD42C9 |
| 30 | 101111011101100000110100100001 | 2F760D21 |
|  | 001000001101100111101001010111 | 08367A57 |
| 32 | 10011011010100101111110001100000 | 9B52FC60 |
|  | 10100101011001100111100111100000 | A56679E0 |
|  | 10111001010011111001011000000110 | B7690F0 |
|  | 10101101010011001100001100001111 | AD4CC30F |
| 36 | 101001011111011010000111000011001100 | A5F6870CC |
|  | 101000000101111001100111001101101001 | A05F33969 |
| 40 | 1111101010010101011000011010010011001100 | FA9561A4CC |
|  | 1011111101100100011000111000000101101001 | BF64638169 |
| 44 | 10100001110000010000110111101101110100011011 | A1C10DEED1B |
|  | 11101110011010100000100101110010110000001111 | EE6504B960F |
|  | 10101101010010000001011001111110001100111100 | AD48167E33C |
| 48 | 101011011111010100101001000001101110010011000011 | ADF52906E4C3 |
|  | 101001010010011111100100111101111001100000001100 | A549F27BCC0Cii |
| 64 | 1110101001010000000100100011110011010001111111011000 1100110100111 | EA50123CD1FB19A7 |
|  | 1100111010011001110011100101111001010000001010001011 010000011111 | CE99CE5E5028B41F |
|  | 1110001110011101000110010000101000000011111011000100 1011011011011 | E39D190A07D896DB |
|  | 1011001110111101110100110001000010110010110001010000 0111110100001 | B3BDD310B2C50FA1 |

The OLT selects the corresponding delimiter sequence from the Table 1 according to requirements of different systems. For example, for the GPON system of the next generation, the sequence (binarily represented as 10100101011001100111100111100000) that has the length of 32 bits and is defined as 0x A56679E0 may be selected.

In a specific implementation manner, a sending end of the OLT defines the sequence in Upstream_Overhead, and then the OLT embeds the defined Upstream_Overhead into the downstream PLOAMd instruction. The ONU sets the synchronization delimiter of the upstream burst frame according to the delimiter in Upstream_Overhead in the received PLOAMd.

In the embodiment of the present disclosure, another method for generating the delimiter is given. In the PON system, for ease of synchronization and clock recovery, a line encoding technology is adopted. In the upstream transmission, nBmB encoding may be adopted. The principle of the nBmB encoding is that after being encoded, data of n bits forms a code word of m bits, and a code stream after the encoding satisfies the requirement of DC balance, and the requirement that the number of continuous 0 and the number of continuous 1 are as small as possible. The nBmB encoding is generally divided into data and control. For the data, the data of n bits is corresponding to the code word of m bits. For the upstream burst frame, the GTC adopts the nBmB encoding, in order to make the delimiter have better characteristics, the delimiter may be formed by one or more code words in the nBmB encoding.

If the PON system adopts a 9B10B line encoding mechanism, the delimiter according to the embodiment of the present disclosure may be generated according to the 9B10B encoding method. Table 2 provides a group of delimiters corresponding to the illustration of the embodiment of the present disclosure, where the group of delimiters is formed by code words encoded by 9B10B.

TABLE 2

Delimiter sequences provided in the embodiment of the present disclosure

| Bit length | Delimiter sequence (binary) | Delimiter sequence (hexadecimal) |
|---|---|---|
| 30 | 110011000110010010001101001111 | 3319234F |
| 40 | 1000001001011110001110101001011001100 | 825F1EA5CC |
| | 1010000101110000100100110001111011110110 | A170931EF6 |
| | 1011111100010110110011100000010001101001 | BF16CE0469 |
| | 1000111010011101101000010001101001001001 | 8F4F684699 |
| | 1011111100000101001000100100111100111001 | BF05224F39 |

The delimiter sequence of 30 bits provided in Table 2 is formed by 3 code words of 10 bits encoded by 9B10B, where the relativity between the 3 characters of 10 bits and the code words generated by 9B10B encoding is small, and it is easy to differentiate them. Similarly, the delimiter of 40 bits provided in Table 2 is formed by 4 code words of 10 bits. The delimiter sequence provided by Table 2 is generated by 9B10B encoding, so that in addition to the existing method of adding the delimiter sequence, a 9B sequence corresponding to 10B sequence may be added to the sending end, and then the delimiter is generated by the 9B10B encoding of the sending end of the ONU.

Table 1 and Table 2 of the delimiter sequences provided in Embodiment 1 of the present disclosure are based on the preamble 1010 1010 . . . (formed by the cycle of 10) sequence; if the preamble sequence is changed to a 0101 0101 . . . (formed by the cycle of 01) sequence, and a sequence acquired by performing negation on the binary sequence provided in the embodiment also satisfies the characteristics of the burst synchronization delimiter of the present disclosure. For example, after the negation is performed on 1111100001010010110011001, 0000011110101101011001100110 is acquired.

If the preamble sequence is formed by connecting a plurality of 1011101101010010000111100010110 sequences (hexadecimally represented as 0x BB52 1E26) from end to end, Table 3 provides burst synchronization delimiter sequences satisfying this embodiment.

TABLE 3

Delimiter sequences provided in the embodiment of the present disclosure

| Bit length | Delimiter sequence (binary) | Delimiter sequence (hexadecimal) |
|---|---|---|
| 32 | 01111100011101100101000100001011 | 7C76510B |
| | 00001011011110000111011101010001 | 0B787751 |
| | 01111001011101100101000100001011 | 7976510B |
| | 01001011110111100001101110010000 | 4BDE1B90 |
| | 10100011011101100111000011001001 | A37670C9 |
| 64 | 1011100111010100001111100110100001000110001010111100000110010111 | B9D43E68462BC197 |
| | 1011101101010000100111100110011001001001010111101100001110010011 | BB509E6644AF61C9 |
| | 1111101000110010000011110001000010000010111001011110100100111010110 | FA321E2105CDE9D6 |
| | 1011101101010010000111100010001001001010101110110010001110111010 | BB521E2244ADB1DD |
| | 1011011101010010000111110000011001001001010111010111101010000111100 | B7521F0648ADE879 |
| | 1010101111010010000111100010011001001010101011110111100001100110 | ABD21E26552DE199 |

If the preamble sequence is formed by a plurality of 1110110101001000011100010011010 sequences (hexadecimally represented as 0x ED48 789A) from end to end, Table 4 provides burst synchronization delimiter sequences satisfying this embodiment.

TABLE 4

Delimiter sequences provided in the embodiment of the present disclosure

| Bit length | Delimiter sequence (binary) | Delimiter sequence (hexadecimal) |
| --- | --- | --- |
| 32 | 10110111110001110110010100010000 | B7C76510 |
|  | 11001010001001010110111100001110 | CA256F0E |
|  | 01100101000100011011011110000111 | 6511B787 |
|  | 01110101000100001011011111000110 | 7510B7C6 |
|  | 11011011110000110011001010001001 | DBC33289 |
|  | 11101100101000110001011011110000 | ECA316F0 |
|  | 10110000110010001101111000011101 | B0C8DE1D |
|  | 11001010001001010110011110001111 | CA25670F |
|  | 11111001110001100010011011010000 | F9C626D0 |
|  | 11001111000111011100001000100110 | CF1DC226 |
| 64 | 1110110101001000011110001001111100110010101101111000010100100100 | ED48789F32B78524 |
|  | 0110110101111110001010001100111010010010100000011101010100111001 | 6D7E28CE9281D539 |
|  | 1110100101000000011110010001101100001011010111111000110110011100 | E940791B16BF86CC |
|  | 1110110001000010011100001110100001001110111101101010110110001010 | EC41383A13BED6C5 |

Further, different delimiter sequences may be used to differentiate whether a certain application function is started, for example, FEC encoding.

Before the burst synchronization delimiter is sent, an application function selecting instruction is detected, and the preset burst synchronization delimiter is selected according to the application function selecting instruction.

For example, the OLT may define in the PLOAMd two delimiter instructions C and D for differentiating whether a function is started, where C indicates that a certain function is carried, and D indicates that the function does not exist or the function is not started. For example, if the ONU detects the C instruction, the ONU adds the delimiter sequence: 0x AD4CC30F (binarily represented as 10101101010011001100001100001111) that has the length of 32 bits and is provided by the present disclosure, which indicates that the OLT and the ONU have the FEC function; if the ONU detects the D instruction, the ONU adds the delimiter sequence: 0x A56679E0 (binarily represented as 10100101011001100111100111100000) having the length of 32 bits and provided by the present disclosure, and the delimiter sequence indicates that the OLT and the ONU do not have the FEC function, or the FEC function does not need to be started.

It may be known from the foregoing illustration that a corresponding relation between the preset burst synchronization delimiter and the function application instruction may be preset.

Alternatively, in order to improve the accuracy of detecting the upstream burst frame by the receiving end, the OLT may select two groups of sequences with the length of 64 bits as the two delimiter instructions C and D. When the ONU detects the C instruction, for example, the FEC function exists, the ONU adds the delimiter sequence: 0x E39D190A 07D896 DB (binarily represented as 1110001110011101000110010000101000000111110 11000100101101 1011011) that has the length of 64 bits and is provided by the present disclosure, which indicates that the FEC encoding is performed on the upstream burst frame sent by the ONU; if the ONU detects the D instruction, for example, the FEC function does not exist, or the FEC function does not need to be started, the ONU adds the delimiter sequence: 0x B3BDD310 B2C50FA1 (binarily represented as 1011001110111101110100110001000010110010110000101000011111010000 1) that has the length of 64 bits and is provided by the present disclosure, and the delimiter sequence indicates that the FEC encoding is not performed on the upstream burst frame sent by the ONU, or the FEC function does not need to be started.

Alternatively, the OLT directly sends the sequence that is used to indicate whether a certain application function (for example, the FEC function) exists to the ONU, and the ONU uses the received sequence as the burst synchronization delimiter of the upstream burst frame. For example, the burst synchronization delimiter being 0x E39D190A 07D896 DB (binarily represented as 11100011100111010001100100001010000001111101 10001001011011011011) indicates that the FEC encoding needs to be performed on the upstream burst frame sent by the ONU; and the burst synchronization delimiter being 0x B3BDD310 B2C50FA1 (binarily represented as 10110011101111011101001100010000101100101 10001010000111110100001) indicates that the FEC encoding does not need to be performed on the upstream burst frame sent by the ONU, or the FEC function does not need to be started.

Alternatively, each ONU presets the delimiter sequence of the upstream burst frame, and the OLT detects the burst synchronization delimiter sequence in the received upstream burst frame to determine whether it is necessary to perform a certain function operation on the frame, for example, FEC decoding. For example, the burst synchronization delimiter being 0x E39D190A 07D896 DB (binarily represented as 11100011100111010001100100001010000011 11101100010010110110 11011) indicates that the FEC decoding needs to be performed on the upstream burst frame sent by the ONU; and the burst synchronization delimiter being 0x B3BDD310 B2C50FA1 (binarily represented as 1011001110111101110100110001000010110010110000 10100001111101000001) indicates that the FEC decoding does not need to be performed on the upstream burst frame sent by the ONU, or the FEC function does not need to be started.

Further, the OLT may request the ONU to transfer different delimiter sequences according to a line encoding mechanism of the ONU end.

Therefore, before the burst synchronization delimiter is sent, a line encoding mechanism instruction is detected, and the preset burst synchronization delimiter is selected according to the line encoding mechanism instruction.

For example, the GPON system of the next generation may support at least one of 9B10B encoding and Non Return to Zero (NRZ) modulation. For example, the OLT may define in the PLOAMd delimiter instructions E and F corresponding to the two mechanisms, where E is corresponding to the 9B10B encoding mechanism and F is corresponding to the NRZ modulation mechanism. After detecting the corresponding instruction, the ONU adds the delimiter, if the ONU detects the E instruction, the ONU adds the delimiter sequence: 0x BF05224F39 (binarily represented as 1011111100000101001000100100111100111001) that has the length of 40 bits and is provided by the present disclosure; if the ONU detects the F instruction, the ONU adds the delimiter sequence: 0x A56679E0 (binarily represented as 10100101011001100111100111100000) that has the length of 32 bits and is provided by the present disclosure. Alternatively, the ONU may add the delimiter sequence defined in the PLOAMd instruction sent by the OLT to the upstream burst frame, where the OLT sends the corresponding delimiter sequence according to the encoding mechanism of the ONU; if it is detected that the 9B10B encoding is performed at the ONU end, the delimiter sequence: 0x BF05224F39 (binarily represented as 1011111100000101001000100100111100111001) that has the length of 40 bits and is provided by the present disclosure is added; if it is detected that the NRZ modulation is performed at the ONU end, the delimiter sequence: 0x A56679E0 (binarily represented as 10100101011001100111100111100000) that has the length of 32 bits and is provided by the present disclosure is added.

In the embodiment of the present disclosure, the method capable of sending the upstream transfer frame of the GPON system of the next generation is provided, where a better delimiter sequence is adopted, and the sequence provided in the embodiment of the present disclosure may effectively improve the flexibility of the system.

Figure 3:
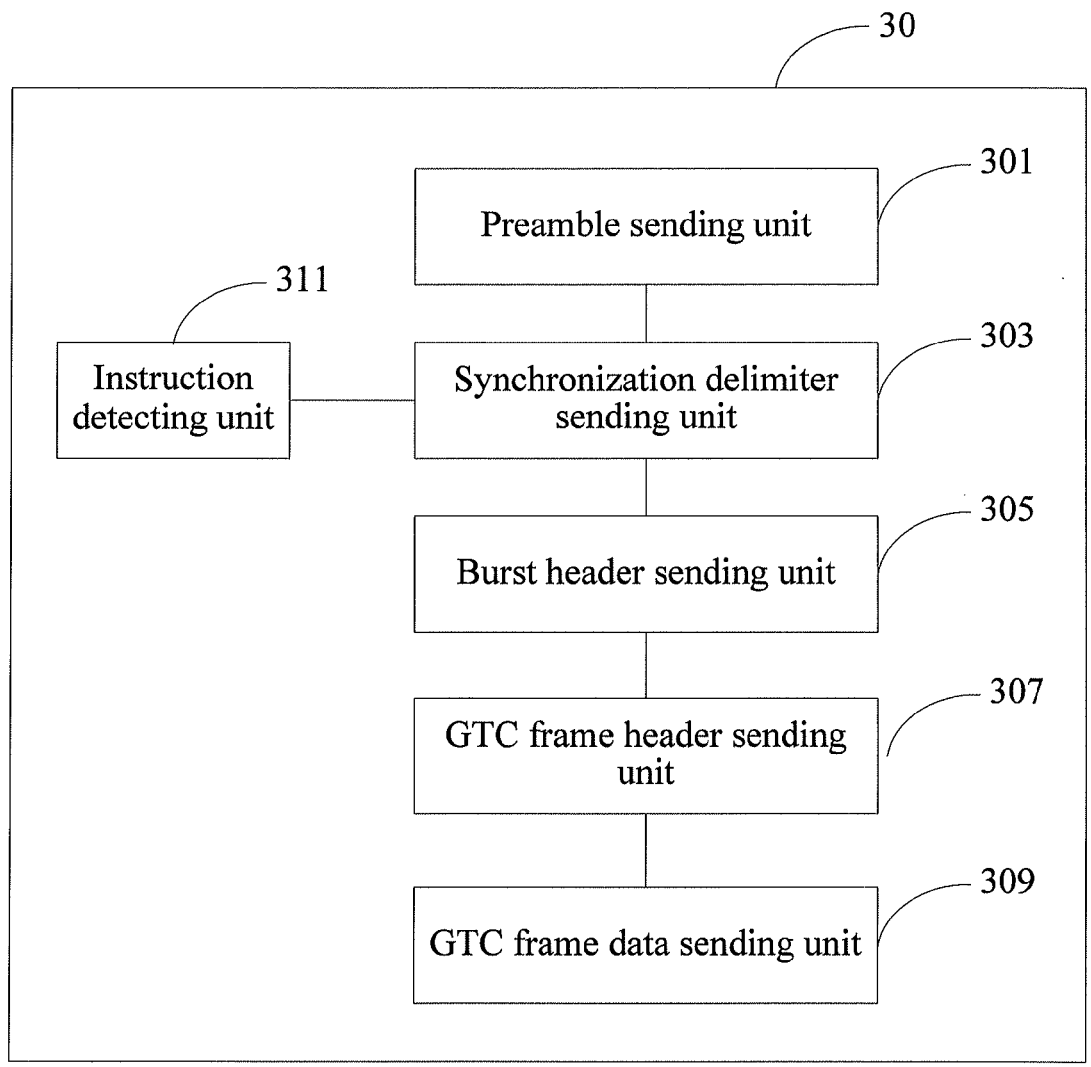
FIG. 3 is a structure block diagram of a device for sending an upstream transfer frame in a PON according to an embodiment of the present disclosure.

Meanwhile, an embodiment of the present disclosure provides a device for sending an upstream transfer frame in a PON, and during application, the device may be used as an ONU. FIG. 3 is a structure block diagram of a device 30 for sending the upstream transfer frame in the PON. In this embodiment, the device 30 for sending the upstream transfer frame in the PON includes a preamble sending unit 301, a synchronization delimiter sending unit 303, a burst header sending unit 305, a GTC frame header sending unit 307, and a GTC frame data sending unit 309. The device 30 may include a processor that communicates with the different units and configured to implement the method for sending an upstream transfer frame in the PON.

The preamble sending unit 301 sends a preamble according to an allocated time slot. During specific implementation, the preamble is preferentially selected as a sequence (hexadecimally represented as 0x AA . . . ) binarily represented as 1010 1010 . . . (formed by a cycle of 10).

After finishing sending the preamble, the synchronization delimiter sending unit 303 sends a burst synchronization delimiter, where in the sent synchronization delimiter, the number of non-zeros is the same as the number of zeros, and in a delimiter sequence, the number of non-zeros on odd bits is equal to the number of zeros on even bits, and the number of non-zeros on even bits is equal to the number of zeros on odd bits; the number of zeros on the odd bits is N, the number of non-zeros on the odd bits is M, a relation |N−M|≦1 is satisfied, that is, a difference between N and M is not greater than 1; in the synchronization delimiter, the number of zeros in a continuous zero group is X, and the number of non-zeros in a continuous non-zero group is Y, a relation |X−Y|≦1 is satisfied.

The burst header sending unit 305 is configured to send a burst header.

The GTC frame header sending unit 307 is configured to send a GTC frame header.

The GTC frame data sending unit 309 is configured to send GTC frame data.

The device further includes an instruction detecting unit 311, configured to detect instruction information in a downstream broadcast frame sent by an OLT, where the synchronization delimiter sending unit 303 selects the preset synchronization delimiter according to the instruction information and sends the preset synchronization delimiter. The instruction information herein may be an application function, an application function selecting instruction, or upstream transmission rate information, and during application, the instruction information may carry 2 or 3 of the foregoing information.

When the preamble is a 1010 1010 . . . sequence, the burst synchronization delimiter sent by the synchronization delimiter sending unit 303 is hexadecimally represented as: A56679E0, the burst synchronization delimiter is binarily represented as: 10100101011001100111100111100000.

Alternatively, the burst synchronization delimiter is hexadecimally represented as: BF05224F39, and the burst synchronization delimiter is binarily represented as: 1011111100000101001000100100111100111001.

When the preamble is a 1010 1010 . . . sequence, the burst synchronization delimiter sent by the synchronization delimiter sending unit 303 is one of hexadecimal sequences in the following:

F85299, 83D699, B7690F0, 3BD42C9, 2F760D21, 08367A57, 9B52FC60, B94F9606, AD4CC30F, A5F6870CC, A05F33969, FA9561A4CC, BF64638169, A1C10DEED1B, EE6504B960F, AD48167E33C, ADF52906E4C3, A549F27BCC0C, 3319 234F, 82 5F1E A5CC, A1 7093 1EF6, BF 16CE 0469, 8F 4F68 4699, EA50123C D1FB19A7, CE99CE5E 5028B41F, E39D190A 07D896 DB, and B3BDD310 B2C50FA1.

If the preamble sequence is changed to a 0101 0101 . . . (formed by a cycle of 01) sequence, a sequence acquired by performing negation under binary on the sequence provided by the foregoing embodiment satisfies the characteristics of the burst synchronization delimiter of the present disclosure. For example, after the negation is performed on 1111100001010010100011001, 0000011110101101011100110 is acquired.

In the embodiment of the present disclosure, the device provides a delimiter sequence that is applicable to the GPON system of the next generation, and the sequence provided in the embodiment of the present disclosure may effectively improve the flexibility of the system.

Only exemplary embodiments of the present disclosure are described above, but the protection scope of the present disclosure is not limited thereto. Modifications and settings capable of being easily figured out by persons skilled in the art within the technical scope of the present disclosure shall be construed as falling within the protection scope of the present disclosure. The protection scope of the present disclosure shall be the protection scope defined by the claims.

What is claimed is:

1. A method for sending an upstream transfer frame in a Passive Optical Network (PON), comprising:
   sending a preamble according to an allocated time slot;
   sending a burst synchronization delimiter, where in the sent synchronization delimiter, the number of non-zeros is the same as the number of zeros, and in a delimiter sequence, the number of non-zeros on odd bits is equal to the number of zeros on even bits, and the number of non-zeros on even bits is equal to the number of zeros on odd bits, the number of zeros on the odd bits is N, the number of non-zeros on the odd bits is M, a relation $|N-M|\leq 1$ is satisfied, in the burst synchronization delimiter, the number of zeros in a continuous zero group is X, the number of non-zeros in a continuous non-zero group is Y, and a relation $|X-Y|\leq 1$ is satisfied; and
   sending a burst header, a Gigabit-Capable Passive Optical Network (GPON) Transmission Convergence (GTC) frame header, and GTC frame data.

2. The method according to claim 1, wherein when the burst synchronization delimiter is hexadecimally represented as: BF05224F39, and the burst synchronization delimiter is binarily represented as: 1011111100000101001000100100111100111001.

3. The method according to claim 1, wherein when the preamble is a sequence formed by a cycle of "10", the burst synchronization delimiter is one of hexadecimal sequences in the following:
   F85299, 83D699, B7690F0, 3BD42C9, 2F760D21, 08367A57, 9B52FC60, B94F9606, A5F6870CC, A05F33969, FA9561A4CC, BF64638169, A1C10DEED1B, EE6504B960F, AD48167E33C, ADF52906E4C3, A549F27BCCOC, 3319234F, 82 5F1EA5CC, A170931EF6, BF16CE0469, 8F4F684699, EA50123CD1FB 19A7, E39D190A07D896DB.

4. The method according to claim 1, wherein when the preamble is a sequence formed by a cycle of "01", the burst synchronization delimiter is a sequence acquired by performing negation under binary on the burst synchronization delimiter corresponding to the preamble that is the sequence formed by the cycle of "10".

5. The method according to claim 1, wherein if the preamble is formed by connecting a plurality of sequences being 1011101101010010000111100010011010 from end to end, the burst synchronization delimiter is one of sequences, hexadecimally represented, in the following: 7C76510B, 0B787751, 7976510B, BB509E6644AF61C9, FA321E2105CDE9D6, BB521E2244ADB1DD, and ABD21E26552DE199.

6. The method according to claim 1, wherein if the preamble is formed by connecting a plurality of sequences being 1110110101001000011110001011010 from end to end, the burst synchronization delimiter is one of sequences, hexadecimally represented, in the following: B7C76510, CA256F0E, 6511B787, 7510B7C6, DBC33289, ECA316F0, B0C8DE1D, CA25670F, F9C626D0, CF1DC226, ED48789F32B78524, 6D7E28CE9281D539, E940791B16BF86CC, and EC41383A13BED6C5.

7. The method according to claim 1, wherein before the sending the burst synchronization delimiter, the method further comprises: detecting a downstream broadcast frame sent by an Optical Line Terminal (OLT), and acquiring carried delimiter information from a Physical Layer Operation Administration Maintenance downstream (PLOAMd) instruction sent by the OLT.

8. The method according to claim 7, wherein a specific burst synchronization delimiter is selected according to the delimiter information carried in the PLOAMd instruction sent by the OLT.

9. The method according to claim 1, further comprising:
   before sending the burst synchronization delimiter, detecting an application function selecting instruction, and selecting a preset burst synchronization delimiter according to the application function selecting instruction.

10. The method according to claim 1, further comprising:
    determining, according to the burst synchronization delimiter, whether a corresponding function application is enabled by the OLT, wherein the preset burst synchronization delimiter has a corresponding relation with a function application instruction.

11. The method according to claim 1, further comprising:
    before sending the burst synchronization delimiter, detecting an application function selecting instruction, and selecting a preset burst delimiter according to a line encoding mechanism instruction.

12. A device for sending an upstream transfer frame in a Passive Optical Network (PON), comprising:
    a preamble sending unit, configured to send a preamble according to an allocated time slot;
    a synchronization delimiter sending unit, configured to send a burst synchronization delimiter, wherein in the sent synchronization delimiter, the number of non-zeros is the same as the number of zeros, and in a delimiter sequence, the number of non-zeros on odd bits is equal to the number of zeros on even bits, and the number of non-zeros on even bits is equal to the number of zeros on odd bits, the number of zeros on the odd bits is N, the number of non-zeros on the odd bits is M, a relation $|N-M|\leq 1$ is satisfied, that is, a difference between N and M is not greater than 1; in the burst synchronization delimiter, the number of zeros in a continuous zero group is X, the number of non-zeros in a continuous non-zero group is Y, and a relation $|X-Y|\leq 1$ is satisfied; and
    a burst header sending unit, configured to send a burst header;
    a Gigabit-Capable Passive Optical Network (GPON) Transmission Convergence (GTC) frame header sending unit, configured to send a GTC frame header; and
    a GTC frame data sending unit, configured to send GTC frame data.

13. The device according to claim 12, further comprising:
    an instruction detecting unit, configured to detect instruction information in a downstream broadcast frame sent by an Optical Line Terminal (OLT), wherein the synchronization delimiter sending unit selects a preset synchronization delimiter according to the instruction information and sends the preset synchronization delimiter.

14. The device according to claim 12, wherein when the preamble is a sequence formed by a cycle of 10, the burst synchronization delimiter sent by the synchronization delimiter sending unit is hexadecimally represented as: and the burst synchronization delimiter is binarily represented as: 1010010101100110011110011100000; or
    the burst synchronization delimiter is hexadecimally represented as: BF05224F39, and the burst synchronization delimiter is binarily represented as: 10111111000001010010001001001111100111001.

15. The device according to claim 12, wherein when the preamble is a sequence formed by a cycle of 10, the burst synchronization delimiter sent by the synchronization delimiter sending unit is one of hexadecimal sequences in the following:

F85299, 83D699, B7690F0, 3BD42C9, 2F760D21, 08367A57, 9B52FC60, B94F9606, A5F6870CC, A05F33969, FA9561A4CC, BF64638169, A1C10DEED1B, EE6504B960F, AD48167E33C, ADF52906E4C3, A549F27BCCOC, 3319234F, 82 5F1EA5CC, A170931EF6, BF16CE0469, 8F4F684699, EA50123CD1FB19A7, E39D190A07D896DB.

* * * * *